US008785560B2

(12) United States Patent
Brothers et al.

(10) Patent No.: US 8,785,560 B2
(45) Date of Patent: *Jul. 22, 2014

(54) EMPLOYING PRETREATMENT AND FLUORINATION OF FLUOROPOLYMER RESIN TO REDUCE DISCOLORATION

(71) Applicant: E I du Pont de Nemours and Company, Wilmington, DE (US)

(72) Inventors: Paul Douglas Brothers, Chadds Ford, PA (US); Gregory Allen Chapman, Washington, WV (US); Subhash Vishnu Gangal, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,332

(22) Filed: May 2, 2013

(65) Prior Publication Data

US 2013/0303701 A1 Nov. 14, 2013

Related U.S. Application Data

(60) Provisional application No. 61/644,655, filed on May 9, 2012.

(51) Int. Cl.
*C08F 8/00* (2006.01)
*C08F 6/14* (2006.01)

(52) U.S. Cl.
USPC ............................ 525/192; 525/199; 525/200

(58) Field of Classification Search
CPC ................ C08F 2/22; C08F 6/14; C08F 8/22; C08F 14/18; C08L 27/24
USPC ......................................... 525/192, 199, 200
See application file for complete search history.

(56) References Cited

U.S. PATENT DOCUMENTS

| | | | |
|---|---|---|---|
| 2,784,170 A | 3/1957 | Walter et al. | |
| 3,282,875 A | 11/1966 | Connolly et al. | |
| 3,391,099 A | 7/1968 | Punderson | |
| 3,700,627 A | 10/1972 | Miller | |
| 4,036,802 A | 7/1977 | Poirier | |
| 4,358,545 A | 11/1982 | Ezzell et al. | |
| 4,552,631 A | 11/1985 | Bissot et al. | |
| 4,626,587 A | 12/1986 | Morgan et al. | |
| 4,675,380 A | 6/1987 | Buckmaster et al. | |
| 4,743,658 A | 5/1988 | Imbalzano et al. | |
| 4,940,525 A | 7/1990 | Ezzell et al. | |
| 5,180,803 A | 1/1993 | Gibbard | |
| 5,391,709 A | 2/1995 | Egres, Jr. et al. | |
| 5,491,214 A | 2/1996 | Daughenbaugh et al. | |
| 5,637,748 A | 6/1997 | Hung et al. | |
| 5,703,185 A | 12/1997 | Blair | |
| 5,859,086 A | 1/1999 | Freund et al. | |
| 6,177,196 B1 | 1/2001 | Brothers et al. | |
| 6,300,445 B1 | 10/2001 | Hung et al. | |
| 6,664,337 B2 | 12/2003 | Hiraga et al. | |
| 6,689,833 B1 | 2/2004 | Bidstrup et al. | |
| 6,794,487 B2 | 9/2004 | Hiraga et al. | |
| 6,838,545 B2 | 1/2005 | Chapman et al. | |
| 7,763,680 B2 | 7/2010 | Aten et al. | |
| 2004/0084296 A1 | 5/2004 | Hori et al. | |
| 2007/0129500 A1 | 6/2007 | Honda et al. | |
| 2010/0204345 A1 | 8/2010 | Yamanaka et al. | |
| 2013/0303707 A1* | 11/2013 | Brothers et al. ............... | 525/356 |

FOREIGN PATENT DOCUMENTS

| | | |
|---|---|---|
| EP | 0469759 A1 | 7/1991 |
| EP | 1170303 A1 | 11/1999 |
| EP | 1054023 A1 | 11/2000 |
| EP | 0928673 B1 | 11/2002 |
| EP | 1380605 A1 | 1/2004 |
| FR | 1140964 | 8/1957 |
| GB | 1210794 | 10/1970 |
| GB | 1299520 | 12/1972 |
| JP | S45 38906 B1 | 12/1970 |
| JP | H11-100543 | 4/1999 |
| JP | 2003082020 A | 3/2003 |
| WO | 2005033150 A1 | 4/2005 |
| WO | 2009014138 A1 | 1/2009 |

OTHER PUBLICATIONS

Tsuda, Nobuhiko et al; "Method for Producing Fluorine-Containing Polymer Compositions With Good Coloring Resistance During Processing", XP002702454, Database CA [Online] Chemical Abstracts Service, Columbus, Ohio, US; May 5, 2005.
Sagisaka, Shigehito et al: Method for Producing Purified Fluorine-Containing Polymer:, XP002712775, Database CA [Online] Chemical Abstracts Service, Columbus, Ohio, US; Jan. 30, 2009.
Hollender, C., Authorized Officer, PCT, International Search Report, PCT/US2013/039357, Sep. 9, 2013.
Hollender, C., Authorized Officer, PCT, International Search Report, PCT/US2013/039358, Sep. 4, 2013.
Hollender, C., Authorized Officer, PCT, International Search Report, PCT/US2013/039360, Jul. 19, 2013.
Hollender, C., Authorized Officer, PCT, International Search Report, PCT/US2013/039363, Jul. 25, 2013.
Hollender, C., Authorized Officer, PCT, International Search Report, PCT/US2013/039365, Jul. 19, 2013.
Hollender, C., Authorized Officer, PCT, International Search Report, PCT/US2013/039367, Sep. 6, 2013.
Hollender, C., Authorized Officer, PCT, International Search Report, PCT/US2013/039369, Oct. 2, 2013.
Hollender, C., Authorized Officer, PCT, International Search Report, PCT/US2013/039374, Jul. 24, 2013.

(Continued)

*Primary Examiner* — Nathan M Nutter

(57) ABSTRACT

Process for reducing thermally induced discoloration of fluoropolymer resin produced by polymerizing fluoromonomer in an aqueous dispersion medium to form aqueous fluoropolymer dispersion and isolating said fluoropolymer from the aqueous medium by separating fluoropolymer resin in wet form from the aqueous medium and drying to produce fluoropolymer resin in dry form. The process comprises:
pretreating the aqueous fluoropolymer dispersion and/or the fluoropolymer resin in wet or dry form; and
exposing the fluoropolymer resin in dry form to fluorine.

14 Claims, No Drawings

(56) References Cited

OTHER PUBLICATIONS

Hollender, C., Authorized Officer, PCT, International Search Report, PCT/US2013/039394, Sep. 5, 2013.
Hollender, C. Authorized Officer, PCT, International Search Report, PCT/US2013/039400, Oct. 1, 2013.
Gometani, Jo et al, "Modified Poly(Chlorotrifluoroethylene) and Chlorotrifluoroethylene Copolymer," May 12, 1984. Chemical Abstracts Service, Columbus, OH.
Hollender, C. Authorized Officer, PCT, International Search Report, PCT/US2013/039402, Oct. 9, 2013.

* cited by examiner

EMPLOYING PRETREATMENT AND FLUORINATION OF FLUOROPOLYMER RESIN TO REDUCE DISCOLORATION

FIELD OF THE INVENTION

This invention relates to a process for reducing thermally induced discoloration of fluoropolymer resin.

BACKGROUND OF THE INVENTION

A typical process for the aqueous dispersion polymerization of fluorinated monomer to produce fluoropolymer includes feeding fluorinated monomer to a heated reactor containing an aqueous medium and adding a free-radical initiator to commence polymerization. A fluorosurfactant is typically employed to stabilize the fluoropolymer particles formed. After several hours, the feeds are stopped, the reactor is vented and purged with nitrogen, and the raw dispersion in the vessel is transferred to a cooling vessel.

The fluoropolymer formed can be isolated from the dispersion to obtain fluoropolymer resin. For example, polytetrafluoroethylene (PTFE) resin referred to as PTFE fine powder is produced by isolating PTFE resin from PTFE dispersion by coagulating the dispersion to separate PTFE from the aqueous medium and then drying. Dispersions of melt-processible fluoropolymers such as copolymers of tetrafluoroethylene and hexafluoropropylene (FEP) and tetrafluoroethylene and perfluoro (alkyl vinyl ethers) (PFA) useful as molding resins can be similarly coagulated and the coagulated polymer is dried and then used directly in melt-processing operations or melt-processed into a convenient form such as chip or pellet for use in subsequent melt-processing operations.

Because of environmental concerns relating to fluorosurfactants, there is interest in using hydrocarbon surfactants in the aqueous polymerization medium in place of a portion of or all of the fluorosurfactant. However, when fluoropolymer dispersion is formed which contains hydrocarbon surfactant and is subsequently isolated to obtain fluoropolymer resin, the fluoropolymer resin is prone to thermally induced discoloration. By thermally induced discoloration is meant that undesirable color forms or increases in the fluoropolymer resin upon heating. It is usually desirable for fluoropolymer resin to be clear or white in color and, in resin prone to thermally induced discoloration, a gray or brown color, sometimes quite dark forms upon heating. For example, if PTFE fine power produced from dispersion containing the hydrocarbon surfactant sodium dodecyl sulfate (SDS) is converted into paste-extruded shapes or films and subsequently sintered, an undesirable gray or brown color will typically arise. Color formation upon sintering in PTFE produced from dispersion containing the hydrocarbon surfactant SDS has been described in Example VI of U.S. Pat. No. 3,391,099 to Punderson. Similarly, when melt processible fluoropolymers such as FEP or PFA are produced from dispersions containing hydrocarbon surfactant such as SDS, undesirable color typically occurs when the fluoropolymer is first melt-processed, for example, when melt processed into a convenient form for subsequent use such as chip or pellet.

SUMMARY OF THE INVENTION

Process for reducing thermally induced discoloration of fluoropolymer resin produced by polymerizing fluoromonomer in an aqueous dispersion medium to form aqueous fluoropolymer dispersion and isolating said fluoropolymer from the aqueous medium by separating fluoropolymer resin in wet form from the aqueous medium and drying to produce fluoropolymer resin in dry form. The process comprises:

pretreating the aqueous fluoropolymer dispersion and/or the fluoropolymer resin in wet or dry form; and exposing the fluoropolymer resin in dry form to fluorine.

Preferably, the process reduces the thermally induced discoloration by at least about 10% as measured by % change in L* on the CIELAB color scale.

The process of the invention is useful for fluoropolymer resin which exhibits thermally induced discoloration which ranges from mild to severe. The process of the invention may be employed for fluoropolymer resin which exhibits thermally induced discoloration prior to treatment which is significantly greater than equivalent fluoropolymer resin of commercial quality manufactured using ammonium perfluorooctanoate fluorosurfactant. The process of the invention is advantageously employed when the fluoropolymer resin has an initial thermally induced discoloration value $(L^*_i)$ at least about 4 L units on the CIELAB color scale below the L* value of equivalent fluoropolymer resin of commercial quality manufactured using ammonium perfluorooctanoate fluorosurfactant.

The invention is particularly useful for fluoropolymer resin obtained from aqueous fluoropolymer dispersion made by polymerizing fluoromonomer containing hydrocarbon surfactant which causes thermally induced discoloration, preferably aqueous fluoropolymer dispersion polymerized in the presence of hydrocarbon surfactant.

DETAILED DESCRIPTION OF THE INVENTION

Fluoromonomer/Fluoropolymer

Fluoropolymer resins are produced by polymerizing fluoromonomer in an aqueous medium to form aqueous fluoropolymer dispersion. The fluoropolymer is made from at least one fluorinated monomer (fluoromonomer), i.e., wherein at least one of the monomers contains fluorine, preferably an olefinic monomer with at least one fluorine or a fluoroalkyl group attached to a doubly-bonded carbon. The fluorinated monomer and the fluoropolymer obtained therefrom each preferably contain at least 35 wt % F, preferably at least 50 wt % F and the fluorinated monomer is preferably independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether) and mixtures thereof. A preferred perfluoroalkyl ethylene monomer is perfluorobutyl ethylene (PFBE). Preferred fluorovinyl ethers include perfluoro(alkyl vinyl ether) monomers (PAVE) such as perfluoro (propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-$ CF$_2$CF$_2$SO$_2$F). Another example is CF$_2$=CF—O—CF$_2$—CF(CF$_3$)—O—CF$_2$CF$_2$CO$_2$CH$_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

A preferred class of fluoropolymers useful for reducing thermally induced discoloration is perfluoropolymers in which the monovalent substituents on the carbon atoms forming the chain or backbone of the polymer are all fluorine atoms, with the possible exception of comonomer, end groups, or pendant group structure. Preferably the comonomer, end group, or pendant group structure will impart no more than 2 wt % C—H moiety, more preferably no greater than 1 wt % C—H moiety, with respect to the total weight of the perfluoropolymer. Preferably, the hydrogen content, if any, of the perfluoropolymer is no greater than 0.2 wt %, based on the total weight of the perfluoropolymer.

The invention is useful for reducing thermally induced discoloration of fluoropolymers of polytetrafluoroethylene (PTFE) including modified PTFE. Polytetrafluoroethylene (PTFE) refers to (a) the polymerized tetrafluoroethylene by itself without any significant comonomer present, i.e. homopolymer and (b) modified PTFE, which is a copolymer of TFE having such small concentrations of comonomer that the melting point of the resultant polymer is not substantially reduced below that of PTFE. The modified PTFE contains a small amount of comonomer modifier which reduces crystallinity to improve film forming capability during baking (fusing). Examples of such monomers include perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the polymer molecule. The concentration of such comonomer is preferably less than 1 wt %, more preferably less than 0.5 wt %, based on the total weight of the TFE and comonomer present in the PTFE. A minimum amount of at least about 0.05 wt % is preferably used to have significant effect. PTFE (and modified PTFE) typically have a melt creep viscosity of at least about 1×10$^6$ Pa·s and preferably at least 1×10$^8$ Pa·s and, with such high melt viscosity, the polymer does not flow in the molten state and therefore is not a melt-processible polymer. The measurement of melt creep viscosity is disclosed in col. 4 of U.S. Pat. No. 7,763,680. The high melt viscosity of PTFE arises from is extremely high molecular weight (Mn), e.g. at least 10$^6$. PTFE can also be characterized by its high melting temperature, of at least 330° C., upon first heating. The non-melt flowability of the PTFE, arising from its extremely high melt viscosity, results in a no melt flow condition when melt flow rate (MFR) is measured in accordance with ASTM D 1238 at 372° C. and using a 5 kg weight, i.e., MFR is 0. The high molecular weight of PTFE is characterized by measuring its standard specific gravity (SSG). The SSG measurement procedure (ASTM D 4894, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful in reducing thermally induced discoloration of low molecular weight PTFE, which is commonly known as PTFE micropowder, so as to distinguish from the PTFE described above. The molecular weight of PTFE micropowder is low relative to PTFE, i.e. the molecular weight (Mn) is generally in the range of 10$^4$ to 10$^5$. The result of this lower molecular weight of PTFE micropowder is that it has fluidity in the molten state, in contrast to PTFE which is not melt flowable. PTFE micropowder has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

The invention is especially useful for reducing thermally induced discoloration of melt-processible fluoropolymers that are also melt-fabricable. Melt-processible means that the fluoropolymer can be processed in the molten state, i.e., fabricated from the melt using conventional processing equipment such as extruders and injection molding machines, into shaped articles such as films, fibers, and tubes. Melt-fabricable means that the resultant fabricated articles exhibit sufficient strength and toughness to be useful for their intended purpose. This sufficient strength may be characterized by the fluoropolymer by itself exhibiting an MIT Flex Life of at least 1000 cycles, preferably at least 2000 cycles, measured as disclosed in U.S. Pat. No. 5,703,185. The strength of the fluoropolymer is indicated by it not being brittle.

Examples of such melt-processible fluoropolymers include homopolymers such as polychlorotrifluoroethylene and polyvinylidene fluoride (PVDF) or copolymers of tetrafluoroethylene (TFE) and at least one fluorinated copolymerizable monomer (comonomer) present in the polymer usually in sufficient amount to reduce the melting point of the copolymer substantially below that of PTFE, e.g., to a melting temperature no greater than 315° C.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min. Additional melt-processible fluoropolymers are the copolymers of ethylene (E) or propylene (P) with TFE or CTFE, notably ETFE and ECTFE.

A preferred melt-processible copolymer for use in the practice of the present invention comprises at least 40-99 mol % tetrafluoroethylene units and 1-60 mol % of at least one other monomer. Additional melt-processible copolymers are those containing 60-99 mol % PTFE units and 1-40 mol % of at least one other monomer. Preferred comonomers with TFE to form perfluoropolymers are perfluoromonomers, preferably perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF$_2$).

All these melt-processible fluoropolymers can be characterized by MFR as recited above for the melt-processible TFE copolymers, i.e. by the procedure of ASTM 1238 using standard conditions for the particular polymer, including a 5 kg weight on the molten polymer in the plastometer for the MFR determination of PFA and FEP Further useful polymers are film forming polymers of polyvinylidene fluoride (PVDF) and copolymers of vinylidene fluoride as well as polyvinyl fluoride (PVF) and copolymers of vinyl fluoride.

The invention is also useful when reducing thermally induced discoloration of fluorocarbon elastomers (fluoroelastomers). These elastomers typically have a glass transition temperature below 25° C. and exhibit little or no crystallinity at room temperature and little or no melting temperature. Fluoroelastomer made by the process of this invention typically are copolymers containing 25 to 75 wt %, based on total weight of the fluoroelastomer, of copolymerized units of a first fluorinated monomer which may be vinylidene fluoride ($VF_2$) or tetrafluoroethylene (TFE). The remaining units in the fluoroelastomers are comprised of one or more additional copolymerized monomers, different from the first monomer, selected from the group consisting of fluorinated monomers, hydrocarbon olefins and mixtures thereof. Fluoroelastomers may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluoroelastomer copolymers include TFE/PMVE, TFE/PMVE/E, TFE/P and TFE/P/$VF_2$. Preferred $VF_2$ based fluorocarbon elastomer copolymers include $VF_2$/HFP, $VF_2$/HFP/TFE, and $VF_2$/PMVE/TFE. Any of these elastomer copolymers may further comprise units of cure site monomer.

Hydrocarbon Surfactants

In one embodiment of the present invention, the aqueous fluoropolymer dispersion medium used to form fluoropolymer resin contains hydrocarbon surfactant which causes thermally induced discoloration in the resin when the fluoropolymer resin is isolated and heated. The hydrocarbon surfactant is a compound that has hydrophobic and hydrophilic moieties, which enables it to disperse and stabilize hydrophobic fluoropolymer particles in an aqueous medium. The hydrocarbon surfactant is preferably an anionic surfactant. An anionic surfactant has a negatively charged hydrophilic portion such as a carboxylate, sulfonate, or sulfate salt and a long chain hydrocarbon portion, such as alkyl as the hydrophobic portion. Hydrocarbon surfactants often serve to stabilize polymer particles by coating the particles with the hydrophobic portion of the surfactant oriented towards the particle and the hydrophilic portion of the surfactant in the water phase. The anionic surfactant adds to this stabilization because it is charged and provides repulsion of the electrical charges between polymer particles. Surfactants typically reduce surface tension of the aqueous medium containing the surfactant significantly.

One example anionic hydrocarbon surfactant is the highly branched C10 tertiary carboxylic acid supplied as Versatic® 10 by Resolution Performance Products.

Versatic® 10
Neodecanoic acid (n+m=7)

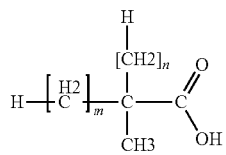

Another useful anionic hydrocarbon surfactant is the sodium linear alkyl polyether sulfonates supplied as the Avanel® S series by BASF. The ethylene oxide chain provides nonionic characteristics to the surfactant and the sulfonate groups provide certain anionic characteristics.

Avanel®
S-70 (n=7, m=11-14)
S-74 (n=3, m=8)

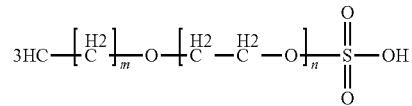

Another group of hydrocarbon surfactants are those anionic surfactants represented by the formula R-L-M wherein R is preferably a straight chain alkyl group containing from 6 to 17 carbon atoms, L is selected from the group consisting of $—ArSO_3^-$, $—SO_3^-$, $—SO_4^-$, $—PO_3^-$, $—PO_4^-$ and $—COO^-$, and M is a univalent cation, preferably $H^+$, $Na^+$, $K^+$ and $NH_4^+$. $—ArSO_3^-$ is aryl sulfonate. Preferred of these surfactants are those represented by the formula $CH_3—(CH_2)_n$-L-M, wherein n is an integer of 6 to 17 and L is selected from $—SO_4M$, $—PO_3M$, $—PO_4M$, or $—COOM$ and L and M have the same meaning as above. Especially preferred are R-L-M surfactants wherein the R group is an alkyl group having 12 to 16 carbon atoms and wherein L is sulfate, and mixtures thereof. Especially preferred of the R-L-M surfactants is sodium dodecyl sulfate (SDS). For commercial use, SDS (sometimes referred to as sodium lauryl sulfate or SLS), is typically obtained from coconut oil or palm kernel oil feedstocks, and contains predominately sodium dodecyl sulfate but may contain minor quantities of other R-L-M surfactants with differing R groups. "SDS" as used in this application means sodium dodecyl sulfate or surfactant mixtures which are predominantly sodium docecyl sulphate containing minor quantities of other R-L-M surfactants with differing R groups.

Another example of anionic hydrocarbon surfactant useful in the present invention is the sulfosuccinate surfactant Lankropol® K8300 available from Akzo Nobel Surface Chemistry LLC. The surfactant is reported to be the following:
Butanedioic acid, sulfo-, 4-(1-methyl-2-((1-oxo-9-octadecenyl)amino)ethyl) ester, disodium salt; CAS No.: 67815-88-7

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

Another preferred class of hydrocarbon surfactants is nonionic surfactants. A nonionic surfactant does not contain a charged group but has a hydrophobic portion that is typically a long chain hydrocarbon. The hydrophilic portion of the nonionic surfactant typically contains water soluble functionality such as a chain of ethylene ether derived from polymerization with ethylene oxide. In the stabilization context, surfactants stabilize polymer particles by coating the particles with the hydrophobic portion of the surfactant oriented towards the particle and the hydrophilic portion of the surfactant in the water phase.

Nonionic hydrocarbon surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

Suitable nonionic hydrocarbon surfactants include octyl phenol ethoxylates such as the Triton® X series supplied by Dow Chemical Company:

Triton®
X15 (n~1.5)
X45 (n~4.5)
X100 (n~10)

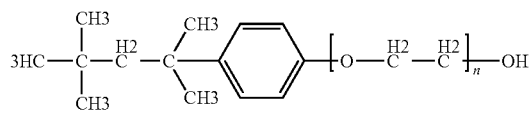

Preferred nonionic hydrocarbon surfactants are branched alcohol ethoxylates such as the Tergitol® 15-S series supplied by Dow Chemical Company and branched secondary alcohol ethoxylates such as the Tergitol® TMN series also supplied by Dow Chemical Company:
Tergitol®
TMN-6 (n~8)
TMN-10 (n~11)
TMN-100 (n~10)

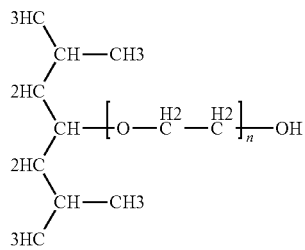

Ethyleneoxide/propylene oxide copolymers such as the Tergitol® L series surfactant supplied by Dow Chemical Company are also useful as nonionic surfactants in this invention.

Yet another useful group of suitable nonionic hydrocarbon surfactants are difunctional block copolymers supplied as Pluronic® R series from BASF, such as:

Pluronic® R
31R1 (m~26, n~8)
17R2 (m~14, n~9)
10R5 (m~8, n~22)
25R4 (m~22, n~23)

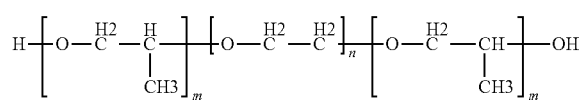

Another group of suitable nonionic hydrocarbon surfactants are tridecyl alcohol alkoxylates supplied as Iconol® TDA series from BASF Corporation.

Iconol®
TDA-6 (n=6)
TDA-9 (n=9)
TDA-10 (n=10)

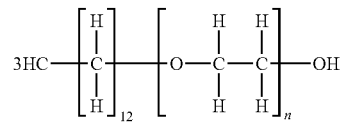

In a preferred embodiment, all of the monovalent substituents on the carbon atoms of the hydrocarbon surfactants are hydrogen. The hydrocarbon is surfactant is preferably essentially free of halogen substituents, such as fluorine or chlorine. Accordingly, the monovalent substituents, as elements from the Periodic Table, on the carbon atoms of the surfactant are at least 75%, preferably at least 85%, and more preferably at least 95% hydrogen. Most preferably, 100% of the monovalent substituents as elements of the Periodic Table, on the carbon atoms are hydrogen. However, in one embodiment, a number of carbon atoms can contain halogen atoms in a minor amount.

Examples of hydrocarbon-containing surfactants useful in the present invention in which only a minor number of monovalent substituents on carbon atoms are fluorine instead of hydrogen are the PolyFox® surfactants available from Omnova Solutions, Inc., described below

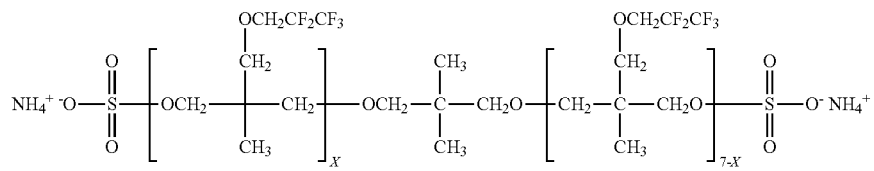

PolyFox™ PF-156A
MW ~190, X = 1 to 7

-continued

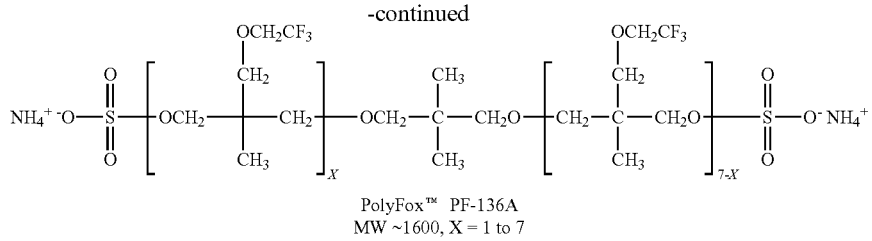

PolyFox™ PF-136A
MW ~1600, X = 1 to 7

Polymerization Process

For the practice of the present invention, fluoropolymer resin is produced by polymerizing fluoromonomer. Polymerization may be suitably carried out in a pressurized polymerization reactor which produces aqueous fluoropolymer dispersion. A batch or continuous process may be used although batch processes are more common for commercial production. The reactor is preferably equipped with a stirrer for the aqueous medium and a jacket surrounding the reactor so that the reaction temperature may be conveniently controlled by circulation of a controlled temperature heat exchange medium. The aqueous medium is preferably deionized and deaerated water. The temperature of the reactor and thus of the aqueous medium will preferably be from about 25 to about 120° C.

To carry out polymerization, the reactor is typically pressured up with fluoromonomer to increase the reactor internal pressure to operating pressure which is generally in the range of about 30 to about 1000 psig (0.3 to 7.0 MPa). An aqueous solution of free-radical polymerization initiator can then be pumped into the reactor in sufficient amount to cause kicking off of the polymerization reaction, i.e. commencement of the polymerization reaction. The polymerization initiator employed is preferably a water-soluble free-radical polymerization initiator. For polymerization of TFE to PTFE, preferred initiator is organic peracid such as disuccinic acid peroxide (DSP), which requires a large amount to cause kickoff, e.g. at least about 200 ppm, together with a highly active initiator, such as inorganic persulfate salt such as ammonium persulfate in a smaller amount. For TFE copolymers such as FEP and PFA, inorganic persulfate salt such as ammonium persulfate is generally used. The initiator added to cause kickoff can be supplemented by pumping additional initiator solution into the reactor as the polymerization reaction proceeds.

For the production of modified PTFE and TFE copolymers, relatively inactive fluoromonomer such as hexafluoropropylene (HFP) can already be present in the reactor prior to pressuring up with the more active TFE fluoromonomer. After kickoff, TFE is typically fed into the reactor to maintain the internal pressure of the reactor at the operating pressure. Additional comonomer such as HFP or perfluoro (alkyl vinyl ether) can be pumped into the reactor if desired. The aqueous medium is typically stirred to obtain a desired polymerization reaction rate and uniform incorporation of comonomer, if present. Chain transfer agents can be introduced into the reactor when molecular weight control is desired.

In one embodiment of the present invention, the aqueous fluoropolymer dispersion is polymerized in the presence of hydrocarbon surfactant. Hydrocarbon surfactant is preferably present in the fluoropolymer dispersion because the aqueous fluoropolymer dispersion is polymerized in the presence of hydrocarbon surfactant, i.e., hydrocarbon surfactant is used as a stabilizing surfactant during polymerization. If desired fluorosurfactant such a fluoroalkane carboxylic acid or salt or fluoroether carboxylic acid or salt may be employed as stabilizing surfactant together with hydrocarbon surfactant and therefore may also present in the aqueous fluoropolymer dispersion produced. Preferably for the practice of the present invention, the fluoropolymer dispersion is preferably free of halogen-containing surfactant such as fluorosurfactant, i.e., contains less than about 300 ppm, and more preferably less than about 100 ppm, and most preferably less than 50 ppm, or halogen-containing surfactant.

In a polymerization process employing hydrocarbon surfactant as the stabilizing surfactant, addition of the stabilizing surfactant is preferably delayed until after the kickoff has occurred. The amount of the delay will depend on the surfactant being used and the fluoromonomer being polymerized. In addition, it is preferably for the hydrocarbon surfactant to be fed into the reactor as the polymerization proceeds, i.e., metered. The amount of hydrocarbon surfactant present in the aqueous fluoropolymer dispersion produced is preferably 10 ppm to about 50,000 ppm, more preferably about 50 ppm to about 10,000 ppm, most preferably about 100 ppm to about 5000 ppm, based on fluoropolymer solids.

If desired, the hydrocarbon surfactant can be passivated prior to, during or after addition to the polymerization reactor. Passivating means to reduce the telogenic behavior of the hydrocarbon-containing surfactant. Passivation may be carried out by reacting said the hydrocarbon-containing surfactant with an oxidizing agent, preferably hydrogen peroxide or polymerization initiator. Preferably, the passivating of the hydrocarbon-containing surfactant is carried out in the presence of a passivation adjuvant, preferably metal in the form of metal ion, most preferably, ferrous ion or cuprous ion.

After completion of the polymerization when the desired amount of dispersed fluoropolymer or solids content has been achieved (typically several hours in a batch process), the feeds are stopped, the reactor is vented, and the raw dispersion of fluoropolymer particles in the reactor is transferred to a cooling or holding vessel.

The solids content of the aqueous fluoropolymer dispersion as polymerized produced can range from about 10% by weight to up to about 65 wt % by weight but typically is about 20% by weight to 45% by weight. Particle size (Dv(50)) of the fluoropolymer particles in the aqueous fluoropolymer dispersion can range from 10 nm to 400 nm, preferably Dv(50) about 100 to about 400 nm.

Isolation of the fluoropolymer includes separation of wet fluoropolymer resin from the aqueous fluoropolymer dispersion. Separation of the wet fluoropolymer resin from the aqueous fluoropolymer dispersion can be accomplished by a variety of techniques including but not limited to gelation, coagulation, freezing and thawing, and solvent aided pelletization (SAP). When separation of wet fluoropolymer resin is carried out by coagulation, the as polymerized dispersion may first be diluted from its as polymerized concentration. Stirring is then suitably employed to impart sufficient shear to the dispersion to cause coagulation and thereby produce undispersed fluoropolymer. Salts such as ammonium carbonate can be added to the dispersion to assist with coagulation if desired. Filtering can be used to remove at least a portion of the aqueous medium from the wet fluoropolymer resin. Separation can be performed by solvent aided pelletization as described in U.S. Pat. No. 4,675,380 which produces granulated particles of fluoropolymer.

Isolating the fluoropolymer typically includes drying to remove aqueous medium which is retained in the fluoropolymer resin. After wet fluoropolymer resin is separated from the dispersion, fluoropolymer resin in wet form can include significant quantities of the aqueous medium, for example, up to 60% by weight. Drying removes essentially all of the aqueous medium to produce fluoropolymer resin in dry form. The wet fluoropolymer resin may be rinsed if desired and may be pressed to reduce aqueous medium content to reduce the energy and time required for drying.

For melt processible fluoropolymers, wet fluoropolymer resin is dried and used directly in melt-processing operations or processed into a convenient form such as chip or pellet for use in subsequent melt-processing operations. Certain grades of PTFE dispersion are made for the production of fine powder. For this use, the dispersion is coagulated, the aqueous medium is removed and the PTFE is dried to produce fine powder. For fine powder, conditions are suitably employed during isolation which do not adversely affect the properties of the PTFE for end use processing. The shear in the dispersion during stirring is appropriately controlled and temperatures less than 200° C., well below the sintering temperature of PTFE, are employed during drying.

Reduction of Thermally Induced Discoloration

To reduce thermally induced discoloration in accordance with the present invention, the aqueous fluoropolymer dispersion and/or the fluoropolymer resin, which may be in wet or dry form, is pretreated and the fluoropolymer resin in dry form is exposed to fluorine. As used in this application, the term "and/or", when used in a list of two or more items, means that any one of the listed items can be employed by itself, or any combination of two or more of the listed items can be employed. Thus for the present invention, either of aqueous fluoropolymer dispersion, the fluoropolymer resin, or both the aqueous fluoropolymer dispersion and the fluoropolymer resin can be pretreated. Preferably, the process of the invention reduces the thermally induced discoloration by at least about 10% as measured by % change in L* on the CIELAB color scale. As discussed in detail in the Test Methods which follow, the % change in L* of fluoropolymer resin samples is determined using the CIELAB color scale specified by International Commission on Illumination (CIE). More preferably, the process reduces the thermally induced discoloration by at least about 20% as measured by % change in L*, still more preferably at least about 30%, and most preferably at least about 50%.

In accordance with the invention, the aqueous fluoropolymer dispersion and/or fluoropolymer resin are pretreated, preferably by exposing the aqueous fluoropolymer dispersion and/or the fluoropolymer resin to an oxidizing agent. In the practice of the present invention, the pretreatment may or may not result in reduction of thermally induced discoloration as measured by % change in L* if employed alone without subsequently exposing the fluoropolymer resin in dry form to fluorine. Moreover, it is possible that the thermally induced discoloration of the fluoropolymer resin may be increased, i.e., the discoloration worsens, by the pretreatment alone without subsequently exposing the fluoropolymer resin in dry form to fluorine. However, the additive effect of the pretreatment in combination with exposing the fluoropolymer resin in dry form to fluorine in accordance with the invention can provide an improvement over the reduction of thermally induced discoloration provided only by exposing the fluoropolymer resin in dry form to fluorine. The reduction of thermally induced discoloration measured by % change in L* on the CIELAB color scale provided by pretreating in combination with exposing the fluoropolymer resin in dry form to fluorine is preferably at least about 10% greater than the % change in L* on the CIELAB color scale provided by only exposing the fluoropolymer resin in dry form to same amount of fluorine, more preferably at least about 20% greater, still more preferably at least about 30% greater, most preferably at least about 50% greater. Preferably, the pretreatment reduces the quantity of fluorine required to reduce thermally induced discoloration to a desired level. Preferably, for a given level of reduction of thermally induced discoloration, pretreating in combination with exposing the fluoropolymer resin in dry form to fluorine reduces the required quantity of fluorine by about 10% compared to only exposing the fluoropolymer resin in dry form to fluorine. More preferably, the pretreatment reduces the required quantity of fluorine by about 25%. Most preferably, the pretreatment reduces the required quantity of fluorine by about 50%.

Pretreatment of the aqueous fluoropolymer dispersion can be accomplished by a variety of techniques. One preferred pretreatment comprises exposing the aqueous fluoropolymer dispersion to ultraviolet light in the presence of an oxygen source. For the practice of this pretreatment, the aqueous fluoropolymer dispersion is preferably first diluted with water to a concentration less than the concentration of the as polymerized aqueous fluoropolymer dispersion because, depending upon the equipment used, exposure of ultraviolet light can be more effective for reducing discoloration for dilute dispersions. Preferred concentrations are about 2 weight percent to about 30 weight percent, more preferably about 2 weight percent to about 20 weight percent.

Ultraviolet light has a wavelength range or about 10 nm to about 400 nm and has been described to have bands including: UVA (315 nm to 400 nm), UVB (280 nm to 315 nm), and UVC (100 nm to 280 nm). Preferably, the ultraviolet light employed has a wavelength in the UVC band.

Any of various types of ultraviolet lamps can be used as the source of ultraviolet light. For example, submersible UV clarifier/sterilizer units sold for the purposes of controlling algae and bacterial growth in ponds are commercially available and may be used for the practice of this pretreatment. These units include a low-pressure mercury-vapor UVC lamp within a housing for the circulation of water. The lamp is protected by a quartz tube so that water can be circulated within the housing for exposure to ultraviolet light. Submersible UV clarifier/sterilizer units of this type are sold, for example, under the brand name Pondmaster by Danner Manufacturing, Inc. of Islandia N.Y. For continuous treatment processes, the dispersion can be circulated though units of this type to expose the dispersion to ultraviolet light. Single pass or multiple pass treatments can be employed.

Dispersion can also be processed in a batch operation in a container suitable for exposure to ultraviolet light in the presence of an oxygen source. In this pretreatment, it is desirable for a suitably protected ultraviolet lamp to be immersed in the dispersion. For example, a vessel normally used for coagulation of the aqueous fluoropolymer dispersion to produce fluoropolymer resin can be used for carrying out the process of this pretreatment by immersing the ultraviolet lamp in the dispersion held in this vessel. The dispersion can be circulated or stirred if desired to facilitate exposure to the ultraviolet light. When the oxygen source is a gas as discussed below, circulation may be achieved or enhanced by injecting the oxygen source into the dispersion. Ultraviolet lamps with protective quartz tubes of the type employed in the submersible UV clarifier/sterilizer units can be employed for immersion in dispersion after being removed from their housing. Other ultraviolet lamps such as medium-pressure mercury-vapor lamps can also be used with the lamp suitably protected for immersion in the dispersion such as by enclosing the lamp in a quartz photowell. A borosilicate glass photowell can also be used although it may decrease effectiveness by filtering ultraviolet light in the UVC and UVB bands. Suitable medium-pressure mercury vapor lamps are sold by Hanovia of Fairfield, N.J.

As used for this pretreatment, "oxygen source" means any chemical source of available oxygen. "Available oxygen" means oxygen capable of reacting as an oxidizing agent. The oxygen source employed in accordance with this pretreatment is preferably selected from the group consisting of air, oxygen rich gas, ozone containing gas and hydrogen peroxide. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

For the practice of this pretreatment, one preferred oxygen source is an ozone containing gas. Another preferred oxygen source for the practice of this pretreatment is hydrogen peroxide. For providing the presence of the oxygen source in the dispersion during exposure to ultraviolet light, air, oxygen rich gas or ozone containing gas can be injected continuously or intermittently into the dispersion, preferably in stoichiometric excess, to provide the oxygen source during the exposure to ultraviolet light. Hydrogen peroxide can be added to the dispersion, also preferably in stoichiometric excess, by adding hydrogen peroxide solution. The concentration of hydrogen peroxide is preferably about 0.1 weight % to about 10 weight % based on fluoropolymer solids in the dispersion.

Ultraviolet light with an oxygen source is effective at ambient or moderate temperatures and thus elevated temperatures are typically not required for the practice of this pretreatment. In a preferred form of this pretreatment, exposing the aqueous fluoropolymer dispersion to ultraviolet light in the presence of an oxygen source is carried out at a temperature of about 5° C. to about 70° C., preferably about 15° C. to about 70° C.

The time for carrying out this pretreatment with vary with factors including the power of the ultraviolet light used, the type of oxygen source, processing conditions, etc. Preferred times for this pretreatment are about 15 minutes to about 10 hours.

Another preferred pretreatment comprises exposing the aqueous fluoropolymer dispersion to light having a wavelength of 10 nm to 760 nm in the presence of an oxygen source and photocatalyst. For the practice of this pretreatment, the aqueous fluoropolymer dispersion is preferably first diluted with water to a concentration less than the concentration of the as polymerized aqueous fluoropolymer dispersion because, depending upon the equipment used, exposure to light can be more effective for reducing discoloration for dilute dispersions. Preferred concentrations are about 2 weight percent to about 30 weight %, more preferably about 2 weight percent to about 20 weight percent.

Light to be employed in accordance with this pretreatment has a wavelength range or about 10 nm to about 760 nm. This wavelength range includes ultraviolet light having a wavelength range of about 10 nm to about 400 nm. Ultraviolet light has a wavelength range or about 10 nm to about 400 nm and has been described to have bands including: UVA (315 nm to 400 nm), UVB (280 nm to 315 nm), and UVC (100 nm to 280 nm). Light to be employed in accordance with this pretreatment also includes visible light having a wavelength range of about 400 nm to about 760 nm.

Any of various types of lamps can be used as the source of light. For example, submersible UV clarifier/sterilizer units sold for the purposes of controlling algae and bacterial growth in ponds are commercially available and may be used for the practice of this pretreatment. These units include a low-pressure mercury-vapor UVC lamp within a housing for the circulation of water. The lamp is protected by a quartz tube so that water can be circulated within the housing for exposure to ultraviolet light. Submersible UV clarifier/sterilizer units of this type are sold, for example, under the brand name Pondmaster by Danner Manufacturing, Inc. of Islandia N.Y. For continuous treatment processes, the dispersion can be circulated though units of this type to expose the dispersion to light. Single pass or multiple pass treatments can be employed.

Dispersion can also be processed in a batch operation in a container suitable for exposure to light in the presence of an oxygen source and photocatalyst. In this pretreatment, it is desirable for a suitably protected lamp to be immersed in the dispersion. For example, a vessel normally used for coagulation of the aqueous fluoropolymer dispersion to produce fluoropolymer resin can be used for carrying out the process of this pretreatment by immersing the lamp in the dispersion held in this vessel. The dispersion can be circulated or stirred if desired to facilitate exposure to the light. When the oxygen source is a gas as discussed below, circulation may be achieved or enhanced by injecting the oxygen source into the dispersion. Ultraviolet lamps with protective quartz tubes of the type employed in the submersible UV clarifier/sterilizer units can be employed for immersion in dispersion after being removed from their housing. Other ultraviolet lamps such as medium-pressure mercury vapor lamps can also be used with the lamp suitably protected for immersion in the dispersion such as by enclosing the lamp in a quartz photowell. A borosilicate glass photowell can also be used although it may decrease effectiveness by filtering ultraviolet light in the UVC and UVB bands. Suitable medium-pressure mercury vapor lamps are sold by Hanovia of Fairfield, N.J.

As used in this pretreatment, "oxygen source" means any chemical source of available oxygen. "Available oxygen" means oxygen capable of reacting as an oxidizing agent. The oxygen source employed in accordance with the present this pretreatment is preferably selected from the group consisting of air, oxygen rich gas, ozone containing gas and hydrogen peroxide. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

For the practice of this pretreatment, one preferred oxygen source is an ozone containing gas. Another preferred oxygen source for the practice of this pretreatment is hydrogen peroxide. For providing the presence of the oxygen source in the dispersion during exposure to ultraviolet light, air, oxygen rich gas or ozone containing gas can be injected continuously or intermittently into the dispersion, preferably in stoichiometric excess, to provide the oxygen source during the exposure to light. Hydrogen peroxide can be added to the dispersion, also preferably in stoichiometric excess, by adding hydrogen peroxide solution. The concentration of hydrogen peroxide is preferably about 0.1 weight ° A to about 10 weight % based on fluoropolymer solids in the dispersion.

Any of a variety of photocatalysts may be used in the practice of this pretreatment. Preferably, the photocatalyst is a heterogeneous photocatalyst. Most preferably, the heterogeneous photocatalyst is selected from form the group consisting of titanium dioxide and zinc oxide. For example, titanium dioxide sold under the tradename Degussa P25 having a primary particle size of 21 nm and being a mixture of 70% anatase and 30% rutile titanium dioxide has been found to be an effective heterogeneous photocatalyst. Heterogeneous photocatalyst can be used by dispersing it into the dispersion prior to exposure to light. Preferred levels of heterogenous photocatalyst are about 1 ppm to about 100 ppm based on fluoropolymer solids in the dispersion.

Light with an oxygen source and photocatalyst is effective at ambient or moderate temperatures and thus elevated temperatures are typically not required for the practice of this pretreatment. In a preferred process in accordance with this pretreatment, exposing the aqueous fluoropolymer dispersion to ultraviolet light in the presence of an oxygen source is carried out at a temperature of about 5° C. to about 70° C., preferably about 15° C. to about 70° C.

The time for carrying out this pretreatment will vary with factors including the power of the ultraviolet light used, the type of oxygen source, processing conditions, etc. Preferred times for this pretreatment are about 15 minutes to about 10 hours.

Another preferred pretreatment comprises exposing the aqueous fluoropolymer dispersion to hydrogen peroxide. For the practice of this pretreatment, the aqueous fluoropolymer dispersion is preferably first diluted with water to a concentration less than the concentration of the as polymerized aqueous fluoropolymer dispersion. Preferred concentrations are about 2 weight percent to about 30 weight percent, more preferably about 2 weight percent to about 20 weight percent.

Exposing of the aqueous fluoropolymer dispersion to hydrogen peroxide is preferably carried out by adding hydrogen peroxide to said aqueous fluoropolymer dispersion, preferably in an amount of about 0.1 weight % to about 10 weight percent based on weight of fluoropolymer solids. Preferably, the exposing of the aqueous fluoropolymer dispersion to hydrogen peroxide is carried out at a temperature of about 10° C. to about 70° C., preferably about 25° C. to about 60° C. The time employed for the exposure of the aqueous fluoropolymer dispersion is preferably about 1 hour to about 48 hours.

It is preferable for the practice of this pretreatment to also inject air, oxygen rich gas, or ozone containing gas into said fluoropolymer dispersion during the exposing of the aqueous fluoropolymer dispersion to the hydrogen peroxide. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume. Introduction of such gases can be accomplished by injecting the gases into the aqueous fluoropolymer dispersion.

Preferably, the exposing of the aqueous fluoropolymer dispersion to hydrogen peroxide is carried out in the presence of $Fe^{+2}$, $Cu^{+1}$, or $Mn^{+2}$ ions. Preferably, the amount of $Fe^{+2}$, $Cu^{+1}$, or $Mn^{+2}$ ions is about 0.1 ppm to about 100 ppm based on fluoropolymer solids in the dispersion.

Although the process can also be carried out in a continuous process, batch processes are preferable since batch processes facilitate controlled times for exposure of the hydrogen peroxide with the aqueous fluoropolymer dispersion to achieve the desired reduction in thermally induced discoloration. A batch process can be carried out in any suitable tank or vessel of appropriate materials of construction and, if desired, has heating capability to heat the dispersion during treatment. For example, a batch process can be carried out in a vessel normally used for coagulation of the aqueous fluoropolymer dispersion which typically includes an impeller which can be used to stirring the dispersion during treatment. Injection of air, oxygen rich gas, or ozone containing gas can also be employed to impart agitation to the dispersion.

Another preferred pretreatment comprises exposing the aqueous fluoropolymer dispersion to oxidizing agent selected from the group consisting of hypochlorite salts and nitrite salts. For the practice of this pretreatment, the aqueous fluoropolymer dispersion is preferably first diluted with water to a concentration less than the concentration of the as polymerized aqueous fluoropolymer dispersion. Preferred concentrations are about 2 weight percent to about 30 weight percent, more preferably about 2 weight percent to about 20 weight percent.

Exposing of the aqueous fluoropolymer dispersion to oxidizing agent selected from the group consisting of hypochlorite salts and nitrite salts is preferably carried out by adding the oxidizing agent to the aqueous fluoropolymer dispersion, preferably in an amount of about 0.05 weight % to about 5 weight percent based on weight of fluoropolymer solids. Preferred hypochlorite salts for addition to the dispersion are sodium hypochlorite or potassium hypochlorite. Sodium hypochlorite or potassium hypochlorite are preferably used in an amount of about 0.05 weight % to about 5 weight percent based on weight of fluoropolymer solids. Provided that aqueous medium of the dispersion is sufficiently alkaline such as by containing sodium hydroxide, hypochlorite can also be generated in situ by injecting chlorine gas into the dispersion. Preferred nitrite salts for addition to the dispersion are sodium nitrite, potassium nitrite and ammonium nitrite. Sodium nitrite, potassium nitrite and ammonium nitrite are preferably used in an amount of about 0.5 weight % to about 5 weight percent based on weight of fluoropolymer solids.

Preferably, the exposing of the aqueous fluoropolymer dispersion to the oxidizing agent is carried out at a temperature of about 10° C. to about 70° C. The exposure time with the aqueous fluoropolymer dispersion is preferably about 5 minutes to about 3 hours.

It is preferable for the practice of this pretreatment to also introduce air, oxygen rich gas, or ozone containing gas into said fluoropolymer dispersion during the exposing of the aqueous fluoropolymer dispersion to the oxidizing agent. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume. Introduction of such gases can be accomplished by injecting such gases into the aqueous fluoropolymer dispersion.

Although the pretreatment can also be carried out in a continuous process, batch processes are preferable since batch processes facilitate controlled times for exposure of the hypochlorite salt or nitrite salt with the aqueous fluoropolymer dispersion to achieve the desired reduction in thermally induced discoloration. A batch process can be carried out in any suitable tank or vessel of appropriate materials of construction and, if desired, has heating capability to heat the dispersion during treatment. For example, a batch process can be carried out in a vessel normally used for coagulation of the aqueous fluoropolymer dispersion which typically includes an impeller which can be used to stirring the dispersion during treatment. Injection of air, oxygen rich gas, or ozone containing gas can also be employed to impart agitation to the dispersion.

Another preferred pretreatment comprises adjusting the pH of the aqueous medium of the aqueous fluoropolymer dispersion to greater than about 8.5 and exposing the aqueous fluoropolymer dispersion to an oxygen source. For the practice of this pretreatment, the aqueous fluoropolymer dispersion is preferably first diluted with water to a concentration less than the concentration of the as polymerized aqueous fluoropolymer dispersion. Preferred concentrations are about 2 weight percent to about 30 weight percent, more preferably about 2 weight percent to about 20 weight percent.

The pH of the aqueous fluoropolymer dispersion preferably is adjusted to about 8.5 to about 11. More preferably, the pH of the aqueous medium of the aqueous fluoropolymer dispersion is adjusted to about 9.5 to about 10.

The pH can be adjusted for the practice of this pretreatment by addition of a base which is sufficiently strong to adjust the pH of the aqueous fluoropolymer dispersion to the desired level and which is otherwise compatible with the processing of the dispersion and the end use properties of the fluoropolymer resin produced. Preferred bases are alkali metal hydroxides such as sodium hydroxide or potassium hydroxide. Ammonium hydroxide can also be used.

As used for this pretreatment, "oxygen source" means any chemical source of available oxygen. "Available oxygen" means oxygen capable of reacting as an oxidizing agent. The oxygen source employed in accordance with this pretreatment is preferably selected from the group consisting of air, oxygen rich gas, ozone containing gas and hydrogen peroxide. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

For the practice of this pretreatment, one preferred oxygen source is an ozone containing gas. Another preferred oxygen source is for the practice of this pretreatment is hydrogen peroxide. For providing the exposure of dispersion to the oxygen source, air, oxygen rich gas or ozone containing gas can be injected continuously or intermittently into the dispersion, preferably in stoichiometric excess. Hydrogen peroxide can be added to the dispersion, also preferably in stoichiometric excess, by adding hydrogen peroxide solution. The concentration of hydrogen peroxide is preferably about 0.1 weight % to about 10 weight % based on fluoropolymer solids in the dispersion.

Preferably, the exposing of the aqueous fluoropolymer dispersion to oxygen source is carried out at a temperature of about 10° C. to about 95° C., more preferably about 20° C. to about 80° C., most preferably about 25° C. to about 70° C. The time employed for the exposure of the aqueous fluoropolymer dispersion to oxygen source is preferably about 5 minutes to about 24 hours.

Although the process can also be carried out in a continuous process, batch processes are preferable since batch processes facilitate controlled times for exposure of the hydrogen peroxide with the aqueous fluoropolymer dispersion to achieve the desired reduction in thermally induced discoloration. A batch process can be carried out in any suitable tank or vessel of appropriate materials of construction and, if desired, has heating capability to heat the dispersion during treatment. For example, a batch process can be carried out in a vessel normally used for coagulation of the aqueous fluoropolymer dispersion which typically includes an impeller which can be used to stirring the dispersion during treatment. Injection of air, oxygen rich gas, or ozone containing gas can also be employed to impart agitation to the dispersion.

Another preferred pretreatment comprises heating the fluoropolymer to a temperature of about 160° C. to about 400° C. and exposing the heated fluoropolymer resin to an oxygen source. In one embodiment of this pretreatment, heating of the fluoropolymer is carried out by convection heating such as in an oven. Preferably, heat transfer gas employed in the oven is the oxygen source or includes the oxygen source as will be discussed below. The heat transfer gas may be circulated to improve heat transfer if desired and the heat transfer gas may include water vapor to increase its humidity.

This pretreatment is advantageously employed for fluoropolymer resin which is melt-processible. The process can be carried out with a melt-processible fluoropolymer resin heated to below or above the melting point of the fluoropolymer resin. Preferably, the process for a melt-processible resin is carried out with the fluoropolymer resin heated to above its melting point.

This pretreatment is also advantageously employed for PTFE fluoropolymer resins (including modified PTFE resins) which are not melt-processible. It is preferred for PTFE resins to be processed below their melting point. Most preferably, PTFE resins are heated to a temperature less than 200° C.

The fluoropolymer can be in various physical forms for processing in accordance with this pretreatment. For processing below the melting point of the fluoropolymer resin, the physical form of the fluoropolymer will have a greater impact on the time necessary to achieve a desired reduction in thermally induced discoloration. Preferably for processing below the melting point, the fluoropolymer resin is processed in finely divided form to promote exposure to the oxygen source such as by employing the powder recovered from isolation of the fluoropolymer, also called flake, prior to melt processing into chip or pellet. For processing above the melting point, the physical form of the fluoropolymer resin is usually less important since the fluoropolymer resin will melt and fuse when heating. Although chip or pellet can also be used for treatment above the melting point, the powder recovered from isolation of the fluoropolymer prior to melt processing into chip or pellet is suitably used. The fluoropolymer resin can be in wet or dry form. If wet fluoropolymer resin is used, drying of the wet fluoropolymer resin results as it is heated.

For this pretreatment, the fluoropolymer resin can be contained in an open container of suitable material such as aluminum, stainless steel, or high nickel alloy such as that sold under the trademark Monel®. Preferably, pans or trays are employed which have a shallow depth to promote exposure to and mass transfer of oxygen from the oxygen source into the fluoropolymer resin.

The pretreatment can be carried out such that the fluoropolymer resin is under static conditions or dynamic conditions. The process is preferably carried out with the fluoropolymer resin under static conditions if the fluoropolymer is processed above the melting point and is preferably carried out with the fluoropolymer resin under dynamic conditions if processed below the melting point. "Static conditions" means that the fluoropolymer is not subjected to agitation such as by stirring or shaking although the heat transfer gas for convection heating may be circulated as noted above. Under static conditions, some settling of the resin may occur or, if conducted above the melting point, some flow of the melted resin within the container may occur. "Dynamic conditions" means that the process is carried while moving the fluoropolymer resin such as by stirring or shaking or actively passing a heat transfer gas through the fluoropolymer resin which may additionally cause movement the fluoropolymer resin. Heat transfer and mass transfer can be facilitated by the use of dynamic conditions which can be provided by, for example, a fluidized bed reactor or by otherwise flowing the gas through the polymer bed.

As used for this pretreatment, "oxygen source" means any chemical source of available oxygen. "Available oxygen" means oxygen capable of reacting as an oxidizing agent. The oxygen source preferably is either the heat transfer gas or is a component of the heat transfer gas. Preferably, the oxygen source is air, oxygen rich gas, or ozone-containing gas. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume. For example, when the oxygen source is air, an air oven can be used to carry out the process. Oxygen or ozone can be supplied to the air oven to provide an oxygen rich gas, i.e., oxygen enriched air, or ozone-containing gas, i.e., ozone enriched air, respectively.

The time necessary to carry out this pretreatment will vary with factors including the temperature employed, the oxygen source employed, the rate of circulation of the heat transfer gas, and the physical form of the fluoropolymer resin. In general, treatment times for the process carried out below the melting point of the fluoropolymer are significantly longer than those for processes carried out above the melting point. For example, fluoropolymer resin treated using air as the oxygen source below the melting point may require processing for about 1 to 25 days to achieve the desired color reduction. The time for a process carried out using air as the oxygen source above the melting point generally may vary from about 15 minutes to about 10 hours.

Resin treated above the melting point typically results in the formation of solid slabs of fluoropolymer resin which may be chopped into suitably-sized pieces to feed a melt extruder for subsequent processing.

Another preferred pretreatment comprises melt extruding the fluoropolymer resin to produce molten fluoropolymer resin and exposing the molten fluoropolymer resin to an oxygen source during the melt extruding. "Melt extruding" as used for this pretreatment means to melt the fluoropolymer resin and to subject the molten fluoropolymer resin to mixing of the fluoropolymer resin. Preferably, the melt extruding provides sufficient shear to provide effective exposure of the oxygen source with the molten fluoropolymer resin. To carry out melt extrusion for this pretreatment, various equipment can be used. Preferably, the molten fluoropolymer resin is processed in a melt extruder. Fluoropolymer flake after isolation is often processed by melt extrusion into chip or pellet and this is a convenient point in the manufacturing process to practice the process of this pretreatment. Various types of extruders such a single-screw or multi-screw extruder can be used. Combinations of extruders are also suitably used. Preferably, the melt extruder provides a high shear section such as by including kneading block sections or mixing elements to impart high shear to the molten fluoropolymer resin. In the event more residence time than can be provided in an extruder is desired, a kneader such as a surface renewal type kneader as disclosed in Hiraga et al. U.S. Pat. No. 6,664,337 can be used to carry out this pretreatment.

For the practice of the process of this pretreatment, extruders or kneaders are suitably fitted with a port or ports for injecting the oxygen source for exposure with the fluoropolymer. A vacuum port for removing volatiles is also preferably provided. Equipment and methods useful for stabilizing melt-processible fluoropolymers, for example, those disclosed in Chapman et al., U.S. Pat. No. 6,838,545, can be used to carry out the process of this pretreatment.

As used for this pretreatment, "oxygen source" means any chemical source of available oxygen. "Available oxygen" means oxygen capable of reacting as an oxidizing agent. Preferably, the oxygen source is air, oxygen rich gas, or ozone-containing gas. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

In the practice of this pretreatment, the oxygen source can be injected to an appropriate port in the melt extruding equipment and the molten fluoropolymer resin is thereby exposed to the oxygen source. The location at which the molten polymer is exposed to oxygen source may be referred to as the reaction zone. In preferred melt extruders for the practice of this pretreatment having at least one high shear section provided with kneading blocks or mixing elements, the molten fluoropolymer resin is exposed to the oxygen source in the high shear section, i.e., the reaction zone is in a high shear section. Preferably, the process of this pretreatment is carried out in multiple stages, i.e., the extruder has more than one reaction zone for exposure of the molten fluoropolymer to oxygen source. The amount of oxygen source required will vary with the degree of thermally induced discoloration exhibited by the fluoropolymer resin. It is usually desirable to employ a stoichiometric excess of the oxygen source.

Another preferred pretreatment comprises exposing wet fluoropolymer resin to an oxygen source during drying. The wet fluoropolymer resin for use in this pretreatment is preferably undispersed fluoropolymer as separated from the dispersion. Any of various equipment known for use in drying fluoropolymer resin can be used for this pretreatment. In such equipment a heated drying gas, typically air, is used as a heat transfer medium to heat the fluoropolymer resin and to convey away water vapor and chemicals removed from the fluoropolymer resin during drying. Preferably in accordance with this pretreatment, the drying gas employed is the oxygen source or includes the oxygen source as discussed below.

The process of this pretreatment can be carried out such that the fluoropolymer resin is dried under static conditions or dynamic conditions. "Static conditions" means that the fluoropolymer is not subjected to agitation such as by stirring or shaking during drying although drying in equipment such as tray drying in an oven result in circulation of the drying gas by convection. "Dynamic conditions" means that the process is carried while moving the fluoropolymer resin such as by stirring or shaking or actively passing a drying gas through the fluoropolymer resin which may additionally cause movement the fluoropolymer resin. Heat transfer and mass transfer can be facilitated by the use of dynamic conditions, for example, flowing the drying gas through the polymer bed. Preferably, the process of this pretreatment is carried out under dynamic conditions. Preferred equipment and process conditions for drying under dynamic conditions is disclosed by Egres, Jr. et al. U.S. Pat. No. 5,391,709, in which the wet fluoropolymer resin is deposited as a shallow bed on fabric and dried by passing heated air through the bed, preferably from top to bottom.

As used for this pretreatment, "oxygen source" means any chemical source of available oxygen. "Available oxygen" means oxygen capable of reacting as an oxidizing agent. Preferably, the oxygen source is air, oxygen rich gas, or ozone-containing gas. "Oxygen rich gas" means pure oxygen and gas mixtures containing greater than about 21% oxygen by volume, preferably oxygen enriched air. Preferably, oxygen rich gas contains at least about 22% oxygen by volume. "Ozone containing gas" means pure ozone and gas mixtures containing ozone, preferably ozone enriched air. Preferably, the content of ozone in the gas mixture is at least about 10 ppm ozone by volume.

One preferred oxygen source for practice of this pretreatment is ozone containing gas, preferably ozone enriched air. Ozone enriched air as the drying gas can be provided by employing an ozone generator which feeds ozone into the drying air as it is supplied to the drying apparatus used. Another preferred oxygen source is oxygen rich gas, preferably oxygen enriched air. Oxygen enriched air as the drying gas can be provided by feeding oxygen into the drying air as it is supplied to the drying apparatus used. Oxygen enriched air can also be provided by semipermeable polymeric membrane separation systems.

Temperatures of drying gas during drying can be in the range of about 100° C. to about 300° C. Higher temperature drying gases shorten the drying time and facilitate the reduction of thermally induced discoloration. However, temperatures of the drying gas should not cause the temperature of the fluoropolymer resin to reach or exceed its melting point which will cause the fluoropolymer to fuse. For melt-processible fluoropolymers, preferred drying gas temperatures are 160° C. to about 10° C. below the melting point of the fluoropolymer. The end use properties of PTFE resin can be adversely affected by temperatures well below its melting point. Preferably, PTFE resin is dried using drying gas at a temperature of about 100° C. to about 200° C., more preferably, about 150° C. to about 180° C.

The time necessary to carry out the process of this pretreatment will vary with factors including the thickness of the wet fluoropolymer resin being dried, the temperature employed, the oxygen source employed and the rate of circulation of the drying gas. When ozone containing gas is used as the oxygen source, the reduction of thermally induced discoloration can be accomplished during normal drying times, preferably in the range of about 15 minutes to 10 hours. If desired, the pretreatment can be continued after the fluoropolymer resin is dry for the purposes of reducing thermally induced discoloration.

More than one pretreatment can be employed if desired and such pretreatments can be performed on aqueous fluoropolymer dispersion, fluoropolymer resin or both.

Exposure to fluorine may be carried out with a variety of fluorine radical generating compounds but preferably exposure of the fluoropolymer resin is carried out by contacting the fluoropolymer resin with fluorine gas. Since the reaction with fluorine is very exothermic, it is preferred to dilute the fluorine with an inert gas such as nitrogen. The level of fluorine in the fluorine/inert gas mixture may be 1 to 100 volume % but is preferably about 5 to about 25 volume % because it is more hazardous to work with pure fluorine. For fluoropolymer resins in which the thermally induced discoloration is severe, the fluorine/inert gas mixture should be sufficiently dilute to avoid overheating the fluoropolymer and the accompanying risk of fire.

Heating the fluoropolymer resin during exposure to fluorine increases the reaction rate. Because the reaction of fluorine to reduce thermally induced discoloration is very exothermic, some or all of the desired heating may be provided by the reaction with fluorine. The process of the invention can be carried out with the fluoropolymer resin heated to a temperature above the melting point of the fluoropolymer resin or at a temperature below the melting point of the fluoropolymer resin.

For the process carried out below the melting point, the exposing of the fluoropolymer resin to fluorine is preferably carried out with the fluoropolymer resin heated to a temperature of about 20° C. to about 250° C. In one embodiment, the temperature employed is about 150° C. to about 250° C. In one another embodiment, the temperature is about 20° C. to about 100° C. For PTFE fluoropolymer resins (including modified PTFE resins) which are not melt-processible, i.e., PTFE fine powders, it is desirable to carry the process below the melting point of the PTFE resin to avoid sintering and fusing the resin. Preferably, PTFE fine powder resins are heated to a temperature less than about 200° C. to avoid adversely affecting end use characteristics of the PTFE resin. In one preferred embodiment, the temperature is about 20° C. to about 100° C.

For fluoropolymers which are melt-processible, the process can be carried out with the fluoropolymer heated to below or above the melting point of the fluoropolymer resin. Preferably, the process for a melt-processible resin is carried out with the fluoropolymer resin heated to above its melting point. Preferably, the exposing of the fluoropolymer resin to fluorine is carried out with the fluoropolymer resin heated to a temperature above its melting up to about 400° C.

For processing with the fluoropolymer resin heated to below the melting point, the fluoropolymer resin is preferably processed in particulate form to provide desirable reaction rates such as powders, flake, pellets or beads. Suitable apparatus for processing below the melting point are tanks or vessels which contain the fluoropolymer resin for exposure to a fluorine or fluorine/inert gas mixture while stirring, tumbling, or fluidizing the fluoropolymer resin for uniform exposure of the resin to fluorine. For example, a double cone blender can be used for this purpose. Equipment and methods useful for the removal of unstable end groups in melt-processible fluoropolymers, for example, those disclosed in Morgan et al., U.S. Pat. No. 4,626,587 and Imbalzano et al., U.S. Pat. No. 4,743,658, can be used to expose the fluoropolymer resin to fluorine at a temperature below its melting point. In general, more fluorine is necessary for reducing thermally induced discoloration to desirable level than is typically required for removing unstable end groups, for example, at least 2 times the amount required for removing unstable end groups can be required. The amount of fluorine required will be dependent upon the level of discoloration but it is usually desirable to employ a stoichiometric excess of fluorine.

For processing the fluoropolymer resin heated to above the melting point, exposure to fluorine can be accomplished by a variety of methods with reactive extrusion being a preferred method for the practice of the present invention. In reactive extrusion, exposure to fluorine is performed while the molten polymer is processed in a melt extruder. When fluoropolymer flake is processed by melt extrusion into chip or pellet is a convenient point in the manufacturing process to practice the process of the invention. Various types of extruders such a single-screw or multi-screw extruders can be used. Combinations of extruders are also suitably used. Preferably, the extruder includes mixing elements to improve mass transfer between the gas and the molten fluoropolymer resin. For the practice of the process of the invention, extruders are suitably fitted with a port or ports for feeding fluorine or fluorine/inert gas mixture for contacting the fluoropolymer. A vacuum port for removing volatiles is also preferably provided. Equipment and methods useful for stabilizing melt-processible fluoropolymers, for example, those disclosed in Chapman et al., U.S. Pat. No. 6,838,545, Example 2, can be used to expose the fluoropolymer to fluorine at a temperature above its melting point. Similar to the process carried out below the melting point, more fluorine is generally necessary for reducing thermally induced discoloration to desirable level than is typically required for removing unstable end groups, for example, at least 2 times the amount required for removing unstable end groups can be required. The amount of fluorine required will be dependent upon the level of discoloration, but it is usually desirable to employ a stoichiometric excess of fluorine. In the event more residence time than is provided in an extruder is desired for the exposure to fluorine, a kneader such as a surface renewal type kneader as disclosed in Hiraga et al. U.S. Pat. No. 6,664,337 can be used to carry out the process of the invention.

The process of the invention is useful for fluoropolymer resin which exhibits thermally induced discoloration which may range from mild to severe. The process is especially useful for aqueous fluoropolymer dispersion which contains hydrocarbon surfactant which causes the thermally induced discoloration, preferably aqueous fluoropolymer dispersion that is polymerized in the presence of hydrocarbon surfactant.

The process of the invention is especially useful when the fluoropolymer resin prior to treatment exhibits significant thermally induced discoloration compared to equivalent commercial fluoropolymers. The invention is advantageously employed when the fluoropolymer resin has an initial thermally induced discoloration value ($L^*_i$) at least about 4 L units below the L* value of equivalent fluoropolymer resin of commercial quality manufactured using ammonium perfluorooctanoate fluorosurfactant. The invention is more advantageously employed when the $L^*_i$ value is at least about 5 units below the L* value of such equivalent fluoropolymer resin, even more advantageously employed when the $L^*_i$ value is at least 8 units below the L* value of such equivalent fluoropolymer resin, still more advantageously employed when the $L^*_i$ value is at least 12 units below the L* value of such equivalent fluoropolymer resin, and most advantageously employed when the $L^*_i$ value is at least 20 units below the L* value of such equivalent fluoropolymer resin.

After the fluoropolymer resin is treated in accordance with the process of the invention, the resulting fluoropolymer resin is suitable for end use applications appropriate for the particular type of fluoropolymer resin. Fluoropolymer resin produced by employing the present invention exhibits reduced thermally induced discoloration without detrimental effects on end use properties.

Test Methods

Raw Dispersion Particle Size (RDPS) of polymer particles is measured using a Zetasizer Nano-S series dynamic light scattering system manufactured by Malvern Instruments of Malvern, Worcestershire, United Kingdom. Samples for analysis are diluted to levels recommended by the manufacturer in 10×10×45 mm polystyrene disposable cuvettes using deionized water that has been rendered substantially free of particles by passing it through a sub-micron filter. The sample is placed in the Zetasizer for determination of Dv(50). Dv(50) is the median particle size based on volumetric particle size distribution, i.e. the particle size below which 50% of the volume of the population resides.

The melting point ($T_m$) of melt-processible fluoropolymers is measured by Differential Scanning calorimeter (DSC) according to the procedure of ASTM D 4591-07 with the melting temperature reported being the peak temperature of the endotherm of the second melting. For PTFE homopolymer, the melting point is also determined by DSC. The unmelted PTFE homopolymer is first heated from room temperature to 380° C. at a heating rate of 10° C. and the melting temperature reported is the peak temperature of the endotherm on first melting.

Comonomer content is measured using a Fourier Transform Infrared (FTIR) spectrometer according to the method disclosed in U.S. Pat. No. 4,743,658, col. 5, lines 9-23 with the following modifications. The film is quenched in a hydraulic press maintained at ambient conditions. The comonomer content is calculated from the ratio of the appropriate peak to the fluoropolymer thickness band at 2428 $cm^{-1}$ calibrated using a minimum of three other films from resins analyzed by fluorine 19 NMR to establish true comonomer content. For instance, the % HFP content is determined from the absorbance of the HFP band at 982 $cm^{-1}$, and the PEVE content is determined by the absorbance of the PEVE peak at 1090 $cm^{-1}$.

Melt flow rate (MFR) of the melt-processible fluoropolymers are measured according to ASTM D 1238-10, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116-07 for FEP and ASTM D 3307-10 for PFA. Five minutes after the sample is charged to the cylinder, it is extruded through a 2.10 mm (0.0825 inch) diameter, 8.00 mm (0.315 inch) long square-edge orifice under a load (piston plus weight) of 5000 grams. Other fluoropolymers are measured according to ASTM D 1238-10 at the conditions which are standard for the specific polymer.

Measurement of Thermally Induced Discoloration

1) Color Determination

The L* value of fluoropolymer resin samples is determined using the CIELAB color scale, details of which are published in CIE Publication 15.2 (1986). CIE L*a*b* (CIELAB) is the color space specified by the International Commission on Illumination (French Commission internationale de l'éclairage). It describes all the colors visible to the human eye. The three coordinates of CIELAB represent the lightness of the color (L*), its position between red/magenta and green (a*), and its position between yellow and blue (b*).

2) PTFE Sample Preparation and Measurement

The following procedure is used to characterize the thermally induced discoloration of PTFE polymers including modified PTFE polymers. 4.0 gram chips of compressed PTFE powder are formed using a Carver stainless steel pellet mold (part #2090-0) and a Carver manual hydraulic press (model 4350), both manufactured by Carver, Inc. of Wabash, Ind. In the bottom of the mold assembly is placed a 29 mm diameter disk of 0.1 mm thick Mylar film. 4 grams of dried PTFE powder are spread uniformly within the mold opening poured into the mold and distributed evenly. A second 29 mm disk is placed on top of the PTFE and the top plunger is placed in the assembly. The mold assembly is placed in the press and pressure is gradually applied until 8.27 MPa (1200 psi) is attained. The pressure is held for 30 seconds and then released. The chip mold is removed from the press and the chip is removed from the mold. Mylar films are pealed from the chip before subsequent sintering. Typically for each polymer sample, two chips are molded.

An electric furnace is heated is heated to 385° C. Chips to be sintered are placed in 4 inch×5 inch (10.2 cm×12.7 cm) rectangular aluminum trays which are 2 inches (5.1 cm) in depth. The trays are placed in the furnace for 10 minutes after which they are removed to ambient temperature for cooling.

4 gm chips processed as described above are evaluated for color using a HunterLab Color Quest XE made by Hunter Associates Laboratory, Inc. of Reston, Va. The Color Quest XE sensor is standardized with the following settings, Mode: RSIN, Area View: Large and Port Size: 2.54 cm. The instrument is used to determine the L* value of fluoropolymer resin samples using the CIELAB color scale.

For testing, the instrument is configured to use CIELAB scale with D65 Illuminant and 10° Observer. The L* value reported by this colorimeter is used to represent developed color with L* of 100 indicating a perfect reflecting diffuser (white) and L* of 0 representing black.

An equivalent fluoropolymer resin of commercial quality manufactured using ammonium perfluorooctanoate fluorosurfactant is used as the standard for color measurements. For the Examples in this application illustrating the invention for PTFE fluoropolymer, an equivalent commercial quality PTFE product made using ammonium perfluorooctanoate fluorosurfactant as the dispersion polymerization surfactant is TEFLON® 601A. Using the above measurement process, the resulting color measurement for TEFLON® 601A is $L^*_{Std\text{-}PTFE}=87.3$ 3) Melt-Processible Fluoropolymers Sample Preparation and Measurement The following procedure is used to characterize discoloration of melt-processible fluoropolymers, such as FEP and PFA, upon heating. A 10.16 cm (4.00 inch) by 10.16 cm (4.00 inch) opening is cut in the middle of a 20.32 cm (8.00 inch) by 20.32 cm (8.00 inch) by 0.254 mm (0.010 inch) thick metal sheet to form a chase. The chase is placed on a 20.32 cm (8.00 inch) by 20.32 cm (8.00 inch) by 1.59 mm (1/16 inch) thick molding plate and covered with Kapton® film that is slightly larger than the chase. The polymer sample is prepared by reducing size, if necessary, to no larger than 1 mm thick and drying. 6.00 grams of polymer sample is spread uniformly within the mold opening. A second piece of Kapton® film that is slightly larger than the chase is placed on top of the sample and a second molding plate, which has the same dimensions as the first, is placed on top of the Kapton® film to form a mold assembly. The mold assembly is placed in a P-H-I 20 ton hot press model number SP-210C-X4A-21 manufactured by Pasadena Hydraulics Incorporated of El Monte, Calif. that is set at 350° C. The hot press is closed so the plates are just contacting the mold assembly and held for 5 minutes. The pressure on the hot press is then increased to 34.5 MPa (5,000 psi) and held for an additional 1 minute. The pressure on the hot press is then increased from 34.5 MPa (5,000 psi) to 137.9 MPa (20,000 psi) over the time span of 10 seconds and held for an additional 50 seconds after reaching 137.9 MPa (20,000 psi). The mold assembly is removed from the hot press, placed between the blocks of a P-H-I 20 ton hot press model number P-210H manufactured by Pasadena Hydraulics Incorporated that is maintained at ambient temperature, the pressure is increased to 137.9 MPa (20,000 psi), and the mold assembly is left in place for 5 minutes to cool. The mold assembly is then removed from the ambient temperature press, and the sample film is removed from the mold assembly. Bubble-free areas of the sample film are selected and 2.86 cm (1⅛ inch) circles are stamped out using a 1⅛ inch arch punch manufactured by C. S. Osborne and Company of Harrison, N.J. Six of the film circles, each of which has a nominal thickness of 0.254 mm (0.010 inch) and nominal weight of 0.37 gram are assembled on top of each other to create a stack with a combined weight of 2.2+/−0.1 gram.

The film stack is placed in a HunterLab ColorFlex spectrophotometer made by Hunter Associates Laboratory, Inc. of Reston, Va., and the L* is measured using a 2.54 cm (1.00 inch) aperture and the CIELAB scale with D65 Illuminant and 10° Observer.

An equivalent fluoropolymer resin of commercial quality manufactured using ammonium perfluorooctanoate fluorosurfactant is used as the standard for color measurements. For the Examples in this application illustrating the invention for FEP fluoropolymer resin, an equivalent commercial quality FEP resin made using ammonium perfluorooctanoate fluorosurfactant as the dispersion polymerization surfactant is DuPont TEFLON® 6100 FEP. Using the above measurement process, the resulting color measurement for DuPont TEFLON® 6100 FEP is $L^*_{Std\text{-}FEP}=79.7$.

4) % change in L* with respect to the standard is used to characterize the change in thermally induced discoloration of the fluoropolymer resin after treatment as defined by the following equation $$\% \text{ change in } L^* = (L^*_t - L^*_i)/(L^*_{Std} - L^*_i) \times 100$$

$L^*_i$=Initial thermally induced discoloration value, the measured value for L on the CIELAB scale for fluoropolymer resins prior to treatment to reduce thermally induced discoloration measured using the disclosed test method for the type of fluoropolymer.

$L^*_t$=Treated thermally induced discoloration value, the measured value for L on the CIELAB scale for fluoropolymer resins after treatment to reduce thermally induced discoloration measured using the disclosed test method for the type of fluoropolymer.

Standard for PTFE: measured $L^*_{Std\text{-}PTFE}=87.3$
Standard for FEP: measured $V_{Std\text{-}FEP}=79.7$

EXAMPLES

Fluoropolymer Preparation

FEP-1: Preparation of Hydrocarbon Stabilized TFE/HFP/PEVE Dispersion

A cylindrical, horizontal, water-jacketed, paddle-stirred, stainless steel reactor having a length to diameter ratio of about 1.5 and a water capacity of 10 gallons (37.9 L) is charged with 60 pounds (27.2 kg) of deionized water. The reactor temperature then is increased to 103° C. while agitating at 46 rpm. The agitator speed is reduced to 20 rpm and the reactor is vented for 60 seconds. The reactor pressure is increased to 15 psig (205 kPa) with nitrogen. The agitator speed is increased to 46 rpm while cooling to 80° C. The agitator speed is reduced to 20 rpm and a vacuum is pulled to 12.7 psi (87.6 kPa). A solution containing 500 ml of deaerated deionized water, 0.5 grams of Pluronic® 31R1 solution and 0.3 gm of sodium sulfite is drawn into the reactor. With the reactor paddle agitated at 20 rpm, the reactor is heated to 80° C., evacuated and purged three times with TFE. The agitator speed is increased to 46 rpm and the reactor temperature then is increased to 103° C. After the temperature has become steady at 103° C., HFP is added slowly to the reactor until the pressure is 470 psig (3.34 MPa). 112 ml of liquid PEVE is injected into the reactor. Then TFE is added to the reactor to achieve a final pressure of 630 psig (4.45 MPa). Then 80 ml of freshly prepared aqueous initiator solution containing 2.20 wt % of ammonium persulfate (APS) is charged into the reactor. Then, this same initiator solution is pumped into the reactor at a TFE to initiator solution mass ratio of twenty-three-to-one for the remainder of the polymerization after polymerization has begun as indicated by a 10 psi (69 kPa) drop in reactor pressure, i.e. kickoff. Additional TFE is also added to the reactor beginning at kickoff at a goal rate of 0.06 lb/min (0.03 kg/min) subject to limitation in order to prevent the reactor from exceeding the maximum desired limit of 650 psig (4.58 MPa) until a total of 12.0 lb (5.44 kg) of TFE has been added to the reactor after kickoff. Furthermore, liquid PEVE is added to the reactor beginning at kickoff at a rate of 0.2 ml/min for the duration of the reaction.

After 4.0 lb (1.8 kg) of TFE has been fed since kickoff, an aqueous surfactant solution containing 45,182 ppm of SDS hydrocarbon stabilizing surfactant and 60,755 ppm of 30% ammonium hydroxide solution is pumped to the autoclave at a rate of 0.2 ml/min. The aqueous surfactant solution pumping rate is increased to 0.3 ml/min after 8.0 lb (3.6 kg) of TFE has been fed since kickoff, and finally to 0.4 ml/min after 11.0 lb (5.0 kg) of TFE has been fed since kickoff resulting in a total of 28 ml of surfactant solution added during reaction. During reaction, the pressure in the reactor reaches the maximum desired limit of 650 psig (4.58 MPa) and the TFE feed rate is reduced from the goal rate to control the pressure. The total reaction time is 266 minutes after initiation of polymerization during which 12.0 lb (5.44 kg) of TFE and 52 ml of PEVE are added. At the end of the reaction period, the TFE feed, PEVE feed, the initiator feed and surfactant solution feed are stopped; an additional 100 ml of surfactant solution is added to the reactor, and the reactor is cooled while maintaining agitation. When the temperature of the reactor contents reaches 90° C., the reactor is slowly vented. After venting to nearly atmospheric pressure, the reactor is purged with nitrogen to remove residual monomer. Upon further cooling, the dispersion is discharged from the reactor at below 70° C.

Solids content of the dispersion is 20.30 wt % and Dv(50) raw dispersion particle size (RDPS) is 146.8 nm. 542 grams of wet coagulum is recovered on cleaning the autoclave. The TFE/HFP/PEVE terpolymer (FEP) has a melt flow rate (MFR) of 16.4 gm/10 min, an HFP content of 11.11 wt %, and a PEVE content of 1.27 wt %, and a melting point of 247.5° C.

FEP-2: Preparation of Hydrocarbon Stabilized TFE/HFP/PEVE Dispersion

A cylindrical, horizontal, water-jacketed, paddle-stirred, stainless steel reactor having a length to diameter ratio of about 1.5 and a water capacity of 10 gallons (37.9 L) is charged with 60 pounds (27.2 kg) of deionized water. The reactor temperature then is increased to 103° C. while agitating at 46 rpm. The agitator speed is reduced to 20 rpm and the reactor is vented for 60 seconds. The reactor pressure is increased to 15 psig (205 kPa) with nitrogen. The agitator speed is increased to 46 rpm while cooling to 80° C. The agitator speed is reduced to 20 rpm and a vacuum is pulled to 12.7 psi (87.6 kPa). A solution containing 500 ml of deaerated deionized water, 0.5 grams of Pluronic® 31R1 solution and 0.3 gm of sodium sulfite is drawn into the reactor. With the reactor paddle agitated at 20 rpm, the reactor is heated to 80° C., evacuated and purged three times with TFE. The agitator speed is increased to 46 rpm and the reactor temperature then is increased to 103° C. After the temperature has become steady at 103° C., HFP is added slowly to the reactor until the pressure is 430 psig (3.07 MPa). 112 ml of liquid PEVE is injected into the reactor. Then TFE is added to the reactor to achieve a final pressure of 630 psig (4.45 MPa). Then 80 ml of freshly prepared aqueous initiator solution containing 2.20 wt % of ammonium persulfate (APS) is charged into the reactor. Then, this same initiator solution is pumped into the reactor at a TFE to initiator solution mass ratio of twenty-to-one for the remainder of the polymerization after polymerization has begun as indicated by a 10 psi (69 kPa) drop in reactor pressure, i.e. kickoff. Additional TFE is also added to the reactor beginning at kickoff at a rate of 0.06 lb/min (0.03 kg/min) subject to limitation in order to prevent the reactor from exceeding the maximum desired limit of 650 psig (4.58 MPa) until a total of 12.0 lb (5.44 kg) of TFE has been added to the reactor after kickoff. Furthermore, liquid PEVE is added to the reactor beginning at kickoff at a rate of 0.3 ml/min for the duration of the reaction.

After 4.0 lb (1.8 kg) of TFE has been fed since kickoff, an aqueous surfactant solution containing 45,176 ppm of SDS hydrocarbon stabilizing surfactant and 60,834 ppm of 30% ammonium hydroxide solution is pumped to the autoclave at a rate of 0.2 ml/min. The aqueous surfactant solution pumping rate is increased to 0.3 ml/min after 6.0 lb (2.7 kg) of TFE has been fed since kickoff, then to 0.4 ml/min after 8.0 lb (3.6 kg) of TFE has been fed since kickoff, to 0.6 ml/min after 10.0 lb (4.5 kg) of TFE has been fed since kickoff, and finally to 0.8 ml/min after 11.0 lb (5.0 kg) of TFE has been fed since kickoff resulting in a total of 47 ml of surfactant solution added during reaction. The total reaction time is 201 minutes after initiation of polymerization during which 12.0 lb (5.44 kg) of TFE and 60 ml of PEVE are added. At the end of the reaction period, the TFE feed, PEVE feed, the initiator feed and surfactant solution feed are stopped; an additional 25 ml of surfactant solution is added to the reactor, and the reactor is cooled while maintaining agitation. When the temperature of the reactor contents reaches 90° C., the reactor is slowly vented. After venting to nearly atmospheric pressure, the reactor is purged with nitrogen to remove residual monomer. Upon further cooling, the dispersion is discharged from the reactor at below 70° C.

Solids content of the dispersion is 20.07 wt % and Dv(50) raw dispersion particle size (RDPS) is 143.2 nm. 703 grams of wet coagulum is recovered on cleaning the autoclave. The TFE/HFP/PEVE terpolymer (FEP) has a melt flow rate (MFR) of 29.6 gm/10 min, an HFP content of 9.83 wt %, a PEVE content of 1.18 wt %, and a melting point of 256.1° C.

Thermally Induced Discoloration

Dried polymer is characterized as described in the Test Methods section above as Measurement of Thermally Induced Discoloration as applicable to the type of polymer used in the following Examples.

Example 1

Pretreatment of Fluoropolymer Resin by Exposure to Oxygen Followed by Exposure to Fluorine Aqueous FEP-1 dispersion polymerized as above is coagulated in a heated glass reactor. 1250 ml of dispersion is heated to 85° C. in a water bath and then transferred to a 2,000 ml jacketed glass reactor with four internal baffles produced by Lab Glass or Vineland, N.J. where the temperature is maintained at by circulating 85° C. water through the jacket. Two high-shear impellers are turned at 2,470 rpm for 3600 seconds to cause the dispersion to separate into a polymer phase and a water phase. The water is separated from the solids by filtering through a 150 micron mesh filter bag model NMO150P1SHS manufactured by The Strainrite Companies of Auburn, Me. The polymer phase is dried for 40 hours in a circulating air oven set at 150° C. to produce a dry powder.

A sample of dried powder is molded to produce color films as described in the Test Methods section above as Measurement of Thermally Induced Discoloration for melt-processible fluoropolymers to establish the base value of L* ($L^*_i$=30.5) for untreated color which value is more than 49 L units below the L* value of FEP fluoropolymer resin of commercial quality manufactured using ammonium perfluorooctanoate fluorosurfactant, where the standard being used for this example is 79.7. The measured color is shown as "Starting Powder" in Table 1.

All of the experiments are carried out with a 25 mm twin-screw extruder, equipped with an injection probe, which is a rod having a longitudinal bore opening flush with the surface of the extruder barrel in the reaction zone, and a vacuum port connected to a fluorine/hydrofluoric acid scrubbing system. The twin-screw extruder feeds into a 3.81 cm (1.5 inch) single-screw extruder, which is equipped with a die. The twin-screw extruder serves as a resin melter and end group reactor in which the desired end group, and in the case of FEP, backbone, stabilization is conducted. The single-screw extruder serves as a melt pump to generate the pressure necessary to move the resin through the optional screen pack and die.

The extrusion equipment described above is a "Kombiplast" extruder from the Coperion Corporation. Corrosion-resistant materials are used for those parts that come into contact with the polymer melt and fluorinating agent. The twin-screw extruder has two corotating screws disposed side by side. The screw configurations are designed with an intermeshing profile and tight clearances, causing them to be self-wiping. The screw configurations include kneading blocks, mixing elements, and conveying screw bushings. The first 19.4 Length/Diameter (L/D, D being the diameter of the bushings) of the extruder is the melting zone. This contains the feeding, solids conveying, and kneading block sections. The kneading block sections provide high shear and insure proper melting of the polymer. The melting section ends with a left handed bushing (rearward pumping) that forms a melt seal and insures complete filling of the final kneading blocks. The reagent is injected immediately after this section. The next 20.7 L/D contain the injection, mixing and reaction sections with multiple mixing elements and constitute the reaction zone of the extruder. The mixing elements used and their arrangement consist of four working sections with TME elements followed by a working section with a single ZME element. The next 5.4 L/D contains the vacuum extraction section (devolatilization zone), which is connected to a scrubbing system designed to neutralize $F_2$, HF, and other reaction products, depending on the reaction being carried out. The vacuum extraction section follows a conventional design, which includes melt forwarding elements that provide for free volume, so that the molten polymer is exposed to subatmospheric pressure, which prevent reactive and corrosive gases from escaping into the atmosphere. The vacuum is operated between 55-90 kPa absolute (8 and 13 psia). Undercut bushings (SK) are an effective way to provide the forwarding elements in the vacuum extraction section of the extruder. The final 3.3 L/D are used to provide a vacuum seal and pump the molten polymer into the single-screw extruder. Chemical reactions mainly occur in the section between the injection nozzle and the vacuum port that contains the mixing sections. Backbone stabilization in the case of FEP occurs in both the kneading block sections and the mixing sections. The twin-screw extruder empties into a single-screw melt pump, which is designed to generate pressure at low shear rates for filtration and pellet formation. The molten polymer passes through a 0.95 cm (3/8 inch) die hole. The melt strand is then quenched in a water bath to produce a solid strand. The strand is then chopped to produce pellets.

The twin-screw extruder is operated with barrel temperatures of 350° C. and a screw speed of 200 rpm. The single-screw extruder is operated with barrel temperatures of 350° C. and a screw speed of 20 rpm. The polymer is fed to the extruder at 18 kg/hr.

Dry, compressed air is injected through a nozzle into the injection zone at an oxygen-to-polymer ratio of 0.10% by weight. The pellets are dried for 40 hours in a circulating air oven set at 150° C. to remove any residual moisture.

The pellets produced by reaction with oxygen from the air injection are processed through the extruder again under the same conditions except the air is replaced with a gas that is 10 volume percent fluorine and 90 volume percent nitrogen. The gas is injected at a fluorine-to-polymer ratio of 0.08% by weight.

The pellets produced with air injection and the pellets produced with air injection followed by fluorine injection are molded to produce color films as described in the Test Methods section above as Measurement of Thermally Induced Discoloration Measurements for melt-processible fluoropolymers are shown in Table 1. L* obtained after pretreatment with air injection ($L^*_t$) is 71.2 with a % change in L* of 82.7% indicating improved color over the starting powder. L* obtained after subsequent exposure to fluorine ($L^*_t$) is 79.5 with a % change in L* of 99.6% indicating an even greater improvement when both pretreatment and fluorination are combined.

TABLE 1

| State | L* | % change in L* |
| --- | --- | --- |
| Starting powder | 30.5 | |
| Pellets produced with air injection | 71.2 | 82.7% |
| Pellets produced with air injection followed by fluorine injection | 79.5 | 99.6% |

Example 2

Pretreatment of Fluoropolymer Dispersion Plus Pretreatment of Fluoropolymer Resin, Subsequent Exposure of Fluoropolymer Resin to Fluorine Aqueous FEP-2 dispersion polymerized as described above is diluted to 5 weight percent solids with deionized water. The dispersion is coagulated by freezing the dispersion at −30° C. for 16 hours. The dispersion is thawed and the water is separated from the solids by filtering through a 150 micron mesh filter bag model NMO150P1SHS manufactured by The Strainrite Companies of Auburn, Me. The solids are dried for 16 hours in a circulating air oven set at 150° C. to produce a dry powder.

A sample of dried powder is molded to produce color films as described in the Test Methods section above as Measurement of Thermally Induced Discoloration for melt-processible fluoropolymers to establish the base value of L* ($L^*_i$=25.9) for untreated color which value is more than 53 L units below the L* value of FEP fluoropolymer resin of commercial quality manufactured using ammonium perfluorooctanoate fluorosurfactant, where the standard being used for this example is 79.7. The measured color is shown as "Starting Powder" in Table 2.

Dispersion Pretreatment: 1200 ml of the 5 weight percent solids FEP dispersion described above is preheated to 50° C. in a water bath. The dispersion and 2 ml of 30 wt % $H_2O_2$ are added to a 2000 ml jacketed glass reactor with internal diameter of 13.3 cm (5¼ inches), which has 50° C. water circulating through the reactor jacket. An impeller with four 3.18 cm (1.25 inch) long flat blades set at a 45° angle and two injection tubes that each have a 12 mm diameter by 24 mm long fine-bubble, fritted-glass cylinder produced by LabGlass as part number 8680-130 are placed in the reactor. The injection tubes are connected to an air supply that is passed through a Drierite gas purification column model 27068 produced by W.A. Hammond Drierite Company of Xenia, Ohio and the air supply is adjusted to deliver 1.42 standard L/min (3.0 standard ft$^3$/hr). The agitator is set at 60 rpm. After 5 minutes of mixing, the dispersion temperature is 48.5° C., and the reaction timer is started. After seven hours of reaction, 42 ml of deionized water and 2 ml of 30 wt % $H_2O_2$ are added to replace evaporative losses. The reaction is ended after 16 hours by stopping the agitator, ceasing the air flow, discontinuing the hot water circulation, and then removing the dispersion from the reactor. The dispersion is coagulated, filtered, dried and molded as described above. The measured color is shown as "Powder after $H_2O_2$ treatment" in Table 2.

Resin Pretreatment: The solids are dried for 2 hours with 180° C. ozone enriched air in the equipment described under "Apparatus for Drying of FEP Polymer" with the use of three AQUA-6 portable ozone generator manufactured by A2Z Ozone of Louisville, Ky. to discharge ozone through three evenly spaced nozzles above the polymer bed. The drying of the fluorpolymer resin with ozone is yet another pretreatment of the resin prior to expose the fluoropolymer to fluorine. The dried powder is molded to produce color films and measured as described above in the Test Methods above as Measurement of Thermally Induced Discoloration for melt-processible fluoropolymers. The measured color is shown as "Powder after ozone drying" in Table 2. The drying is repeated to produce 10 kg of dried powder.

The dried powder is pelletized by extruding it through a 28 mm twin-screw extruder that feeds into a 3.81 cm (1.5 inch) single-screw extruder, which is equipped with a die. The twin-screw extruder serves as a resin melter, and in the case of FEP, backbone stabilization is conducted. The single-screw extruder serves as a melt pump to generate the pressure necessary to move the resin through the optional screen pack and die. The extrusion equipment described above is a "Kombiplast" extruder from the Coperion Corporation. Corrosion-resistant materials are used for those parts that come into contact with the polymer melt. The twin-screw extruder has two co-rotating screws disposed side by side. The screw configurations are designed with an intermeshing profile and tight clearances, causing them to be self-wiping. The screw configurations include kneading blocks, and conveying screw bushings. The twin-screw extruder empties into a single-screw melt pump, which is designed to generate pressure at low shear rates for filtration and pellet formation. The molten polymer passes through a 0.95 cm (⅜ inch) die hole. The melt strand is then quenched in a water bath to produce a solid strand. The strand is then chopped to produce pellets.

The extruders are operated with the barrel temperatures set at 350° C. and screw speeds of 200 rpm for the twin-screw extruder and 20 rpm for the single-screw extruder. The polymer powder is fed at 9.07 kg/hr (20 lb/hr).

Fluorine Exposure: A fluorination reactor is used to further treat the pellets. The fluorination reactor is a modified double-cone blender equipped with gas inlet and vent connections and an electric heating mantle as described in U.S. Pat. No. 4,626,587. The reactor is operated in stationary mode. The fluorination is conducted at 190° C. with 30 minutes of operation at a fluorine/nitrogen ratio of 4/96 volume percent, 30 minutes of operation at a fluorine/nitrogen ratio of 7/93 volume percent, and then 360 minutes of operation at a fluorine/nitrogen ratio of 10/90 volume percent. At the end of the cycle, fluorine flow is stopped, the electric mantle is turned off, and the reactor is evacuated. The residual fluorine is purged from the reactor with nitrogen.

The powder before pretreatment, powder after $H_2O_2$ (dispersion pretreatment), powder after ozone drying (resin pretreatment), extruded pellets, and fluorinated pellets are molded to produce color films as described in the Test Methods section above as Measurement of Thermally Induced Discoloration for melt-processible fluoropolymers. The measured colors are shown in Table 2. L* obtained after pretreatment of dispersion and isolation of the fluoropolymer resin is 37.4 with a % change in L* of 21.4% indicating much improved color after dispersion pretreatment with $H_2O_2$. L* obtained after subsequent drying with ozone is 67.6 with a % change in L* of 77.5% indicating a very much improved color when this second pretreatment is used. L* obtained after subsequent exposure to fluorine is 75.9 with a % change in L* of 92.9% indicating an even greater improvement when pretreatment (s) and fluorination are combined. It is also to be noted that the conditions in the extruder are more aggressive with higher temperature, higher shear rate, and longer residence time than the conditions in the molding operation to produce film test chips. The more aggressive conditions in the extruder result in test chips of extruded pellets which exhibit an initial decrease in L* as compared to the molded powder sample, prior to the exposure the polymer resin to fluorine.

TABLE 2

| State | L* | % change in L* Relative to Starting Material |
|---|---|---|
| Starting Powder | 25.9 | — |
| Powder after $H_2O_2$ treatment (Dispersion Pretreatment) | 37.4 | 21.4% |
| Powder after ozone drying (Resin Pretreatment) | 67.6 | 77.5% |
| Extruded Pellets | 61.9 | 66.9% |
| Fluorinated Pellets | 75.9 | 92.9% |

What is claimed is:

1. Process for reducing thermally induced discoloration of fluoropolymer resin, said fluoropolymer resin produced by polymerizing fluoromonomer in an aqueous dispersion medium to form aqueous fluoropolymer dispersion and isolating said fluoropolymer from said aqueous medium by separating fluoropolymer resin in wet form from the aqueous medium and drying to produce fluoropolymer resin in dry form, said process comprising:
    pretreating the aqueous fluoropolymer dispersion and/or the fluoropolymer resin in wet or dry form; and
    exposing the fluoropolymer resin in dry form to fluorine.

2. The process of claim 1 wherein said process reduces thermally induced discoloration by at least about 10% as measured by % change in L* on the CIELAB color scale.

3. The process of claim 1 wherein said aqueous fluoropolymer dispersion contains hydrocarbon surfactant which causes said thermally induced discoloration.

4. The process of claim 3 wherein said fluoropolymer dispersion is polymerized in the presence of hydrocarbon surfactant.

5. The process of claim 1 wherein said fluoropolymer resin is melt-processible.

6. The process of claim 5 wherein said exposing of said fluoropolymer resin to fluorine is carried out above the melting point of the fluoropolymer resin.

7. The process of claim 6 wherein said exposing the fluoropolymer resin to fluorine is carried out with the fluoropolymer resin heated to a temperature above its melting point up to about 400° C.

8. The process of claim 1 wherein said exposing of said fluoropolymer resin to fluorine is carried out below the melting point of the fluoropolymer resin.

9. The process of claim 8 wherein said exposing fluoropolymer resin to fluorine is carried out with the fluoropolymer resin heated to a temperature of about 20° C. to about 250° C.

10. The process of claim 1 wherein the fluoropolymer resin has an initial thermally induced discoloration value ($L^*_i$) at least about 4 L units on the CIELAB color scale below the L* value of equivalent fluoropolymer resin of commercial quality manufactured using ammonium perfluorooctanoate fluorosurfactant.

11. The process of claim 1 wherein said pretreating the aqueous fluoropolymer dispersion and/or the fluoropolymer resin comprises exposing the aqueous fluoropolymer dispersion and/or the fluoropolymer resin to oxidizing agent.

12. The process of claim 11 wherein said oxidizing agent comprises an oxygen source.

13. The process of claim 1 wherein the reduction of thermally induced discoloration measured by % change in L* on the CIELAB color scale provided by said pretreating in combination with exposing the fluoropolymer resin in dry form to fluorine is at least about 10% greater than the % change in L* on the CIELAB color scale provided by only exposing the fluoropolymer resin in dry form to same amount of fluorine.

14. The process of claim 1 wherein, for a given level of reduction of thermally induced discoloration, said pretreating in combination with exposing the fluoropolymer resin in dry form to fluorine reduces the required quantity of fluorine by at least about 10% compared to only exposing the fluoropolymer resin in dry form to fluorine.

* * * * *